UNITED STATES PATENT OFFICE.

WALTHER MATHESIUS, OF CHARLOTTENBURG, GERMANY.

BRIQUETING IRON ORES.

1,104,124. Specification of Letters Patent. Patented July 21, 1914.

No Drawing. Application filed July 22, 1913. Serial No. 780,480.

*To all whom it may concern:*

Be it known that I, WALTHER MATHESIUS, subject of the King of Prussia, residing at 10 Carmerstrasse, Charlottenburg, near Berlin, German Empire, have invented certain new and useful Improvements in Briqueting Iron Ores, of which the following is a specification.

This invention relates to improvements in the manufacture of briquets from finely-divided iron ores, blast furnace flue dust and the like for smelting purposes. Hitherto it has been proposed to use an admixture of finely ground quartz and lime or to use cement as the binding medium and to subject the mass, after being molded in a press, to steam under pressure for a period of about 10 hours, hydro-silicates being thereby formed which effect the binding of the particles with one another. These processes, however, necessitate the use of a considerable quantity of the binding medium, thus reducing the percentage of iron in the finished briquet. Moreover the binding medium may be expensive. Experiments have shown that a large quantity of the binding medium is necessary owing to the fact that the silicates present in fusions such as cement or blast furnace slag are dissociated extremely slowly under the action of water. It has therefore been proposed to facilitate the dissociation of the silicates by subjecting the materials to be briqueted, before being pressed, to the action of steam at a somewhat lower pressure and for a somewhat shorter period of time than subsequently employed in accelerating the setting operation.

The present invention consists in the employment of a binding medium with which part of the iron oxid contained in the materials to be briqueted is capable of reacting, the binding medium being obtained from alumino-silicates of such highly basic properties that iron oxid is capable of reacting therewith, that is to say, alumino-silicates such as are obtained as the products of calcining or fusion, containing a high percentage of lime with or without other bases.

According to the present invention the highly-basic alumino-silicates are mixed with ferric hydroxid in the presence of water. It is found that in this manner a binding medium is obtained consisting of complex compounds of lime, alumina, silica, and ferric hydroxid and that, if the addition of ferric hydroxid has not exceeded a certain limit, this binding medium will react with further quantities of ferric hydroxid or ferric oxid and, on setting, yield products insoluble in water and having setting properties similar to cement. It is necessary, however, to mix the binding medium in as fresh a state as possible with the material to be briqueted. The binding medium should preferably be prepared from highly basic alumino-silicates in which only a small amount of silica is present in proportion to the amount of alumina, since the aluminates can be much more easily liberated by the action of water than the silicates. In carrying out the aforesaid process the highly basic alumnio-silicates in pulverized form are first of all mixed with ferric hydroxid in the proportion of about one molecule of ferric hydroxid to three molecules of the bases contained in the alumino-silicates, as for example, 3CaO to 1Fe$_2$(OH)$_6$, and thereupon moistened with hot water. After intimate mixture and a moderate period of reaction, not exceeding a few hours, the binding medium so formed is mixed with the iron ores or flue dust or other material to be briqueted and, moistened with hot water if necessary, is molded in a press. In the course of a few hours, setting takes place. If carefully carried out, the addition of about 1 to 2% of the alumino-silicates is sufficient to produce sufficiently firm briquets.

Any highly basic alumino-silicate may be employed for the binding medium, as for example, Portland cement, blast furnace slag or like products of calcination or fusion to which the necessary quantity of lime or other base has been added. In most cases, however, it will be found cheaper to use ordinary burnt lime which is also a highly basic alumino-silicate, since the ordinary lime-stone contains a small quantity of silica and alumina as impurities. If burnt or ground caustic lime, or caustic lime obtained in a finely-divided state by dry slaking or in the form of milk of lime is used in the aforesaid process, the setting reaction between the lime and ferric hydroxid is so intense during the preliminary mixing operation that every particle of lime is immediately surrounded by an envelop of ferric hydroxid which retards the further advance of the reaction. It is therefore necessary in this case to effect the intimate mixture of the materials by means of a wet grinding operation with or without the application of heat.

Preferably, in carrying out the latter process ordinary burnt lime containing small quantities of alumina and silica is mixed with finely-divided iron ore and subjected to a wet grinding and mixing process. The mixture may then be heated to accelerate the reaction of the iron oxid with the lime and the binding medium so obtained is mixed in a fresh state with granular iron-ore so as to react therewith, the mixture being moistened if necessary and thereafter molded into briquets and allowed to set.

In the processes according to the present invention hereinbefore set forth it will be noted that the binding medium consists largely of lime and since lime is entirely unsuitable as a cement, it follows that the binding medium is not a cement, having no binding properties in itself, but that, in combination with iron-ore, it forms a kind of iron cement, the iron acting in a similar manner to the aluminium in Portland and like cement.

As already described, the highly basic alumino-silicates react with the iron ore in two stages, being first caused to combine with a small quantity of iron ore in a preliminary stage and then to combine with a further quantity of iron ore in subsequent stage of the process.

If briquets manufactured as above described were fused in a blast furnace, the expulsion of the water and the decomposition of the aluminates and silicates which effect the setting would take place at a temperature of about 1,000 to 1,100° C. The briquet would therefore disintegrate at this temperature unless the materials agglomerated.

Inasmuch as the fusing point of cement and ferrites containing a high percentage of lime, corresponding say to the formula 3CaOFe$_2$O$_3$ exceeds 1500° C. and as these substances even when mixed fuse at temperatures of about 1200 to 1300° C., it is necessary to reduce the fusing point of the highly basic binding medium. This may be effected by adding small quantities of other bases, such as magnesium oxid, strontium oxid, barium oxid, or the like and introducing similar small quantities of similarly reacting acids such as titanic acid.

I claim:—

1. Method of briqueting finely-divided iron ores, blast-furnace flue dust and the like which consists in forming a binding medium containing a base, alumino-silicates and iron oxid by mixing pulverized highly basic alumino-silicates with ferric hydroxid and warm water, mixing the binding medium with the material to be briqueted and molding the whole.

2. Method of briqueting finely-divided iron ores, blast-furnace flue dust and the like which consists in forming a binding medium containing a base, alumino-silicates and iron oxid by mixing pulverized highly basic alumino-silicates with ferric hydroxid and warm water in the proportion of about one molecule of ferric-hydroxid to three molecules of the bases contained in the basic alumino-silicates, mixing the binding medium with the material to be briqueted and molding the whole.

3. Method of briqueting finely-divided iron ores, blast-furnace flue dust and the like which consists in forming a binding medium containing lime, alumino-silicates and iron oxid by mixing caustic lime containing alumino-silicates with ferric hydroxid by wet grinding, thereupon mixing the binding medium with the material to be briqueted and molding the whole.

4. Method of briqueting finely-divided iron ores, blast-furnace flue dust and the like which consists in forming a binding medium containing lime, alumino-silicates and iron oxid by mixing caustic lime containing alumino-silicates with ferric-hydroxid by wet grinding in the presence of heat, thereupon mixing the binding medium with the material to be briqueted and molding the whole.

5. Method of briqueting finely-divided iron ores, blast-furnace flue dust and the like which consists in forming a binding medium by mixing pulverized highly basic alumino-silicates with ferric-hydroxid and warm water, mixing the binding medium with the material to be briqueted and with small quantities of fusing-point lowering agents, and molding the whole.

6. Method of briqueting finely-divided iron ores, blast-furnace flue dust and the like which consists in forming a binding medium by mixing pulverized highly basic alumino-silicates with ferric-hydroxid and warm water in the proportion of about one molecule of ferric hydroxid to three molecules of the bases contained in the basic alumino-silicates, mixing the binding medium with the material to be briqueted and with small quantities of fusing-point lowering agents, and molding the whole.

7. Method of briqueting finely-divided iron ores, blast-furnace flue dust and the like which consists in forming a binding medium by mixing caustic lime containing alumino-silicates with ferric-hydroxid by wet grinding, thereupon mixing the binding medium with the material to be briqueted and with small quantities of fusing-point lowering agents, and molding the whole.

In testimony whereof I have affixed my signature in presence of two witnesses.

WALTHER MATHESIUS.

Witnesses:
 WOLDEMAR HAUPT,
 HENRY HASPER.